May 12, 1959    M. BAERMANN    2,886,149
MAGNETIC FRICTION BRAKE OR CLUTCH
Filed Nov. 21, 1955
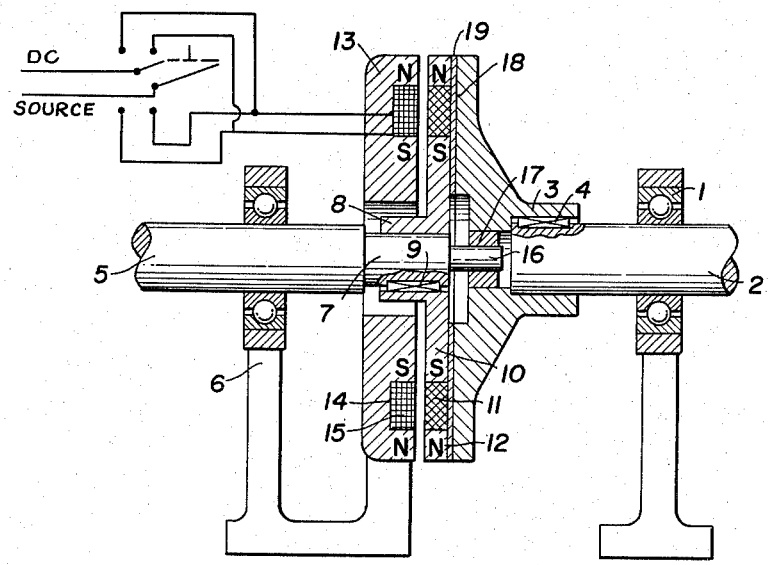
INVENTOR.
MAX BAERMANN
BY
ATTORNEY United States Patent Office 2,886,149
Patented May 12, 1959

2,886,149
MAGNETIC FRICTION BRAKE OR CLUTCH

Max Baermann, Cologne, Germany

Application November 21, 1955, Serial No. 548,174

Claims priority, application Germany July 18, 1955

11 Claims. (Cl. 192—18)

This invention pertains to the art of magnetic friction brakes or clutches, and more particularly to a magnetic friction brake or clutch which is controlled by electric current impulses.

Electro-magnetically actuated friction brakes or clutches are already known. These contain a direct current actuated coil, the magnetic field of which develops the frictional pressure required for operating the clutch or brake. The actuating current is carried to the coil by slip rings.

In order to prevent the operating difficulties which often occur with slip rings, it has been proposed heretofore that the coil be made stationary and only the ferromagnetic conducting pieces rotated. Both constructions have the disadvantage that electric current must be continuously supplied to the coil whenever the brake or clutch is engaged.

On the other hand, it has been proposed heretofore to generate the power required for the brake or clutch by permanent magnetic systems, which are adjustable. Such devices can be engaged or disengaged by a relative movement of the parts of the permanent magnetic circuit. Such constructions, while not requiring a continuous electrical power supply, do require the use of mechanical means for controlling the brake or clutch. Remote control is thus difficult.

Still further, constructions designated as brake-couplings are known, in which the friction pressure required for coupling the members together is generated by an electro-magnet. After shutting off the electro-magnet, a thrust plate is moved against a stationary armature by means of permanent magnetic power, and braked there. Such devices also require a constant supply of electrical power when engaged.

The present invention contemplates a new and improved clutch or brake which, on the one hand does not require a constant current supply either to be held in the engaged or disengaged position, and on the other hand permits remote control by electrical circuits.

In accordance with the present invention, there is provided in combination with first and second relatively rotatable coaxial members, a clutch or brake disc fixed against rotation relative to one member and axially movable relative to the second member, such disc being provided with permanent-magnet ring-shaped magnetic poles, and an electro-magnet placed opposite the ring-shaped magnetic poles, the arrangement being such that by changing the magnetic polarity of the electro-magnet, the disc can be moved either in the direction of the second member or in the direction of the electro-magnet, for engaging or disengaging either or both the second member or the electro-magnet. The frictional or coupling pressures are developed directly by the attraction of the magnetic poles on the disc for the magnetic material of the second member, or of the electro-magnet. The electro-magnet simply serves the purpose of shifting the disc from the second member to the electro-magnet and thus requires only a brief direct current impulse, which needs to last only until the electro-magnet reaches a condition of excitation, when poles are formed which cause the axial movement of the clutch or brake disc which, as above pointed out, is pre-polarized in a specific direction by the permanent magnet.

To prevent too strong adhesion of the clutch disc to the other members, a layer of non-magnetic material of suitable strength or of suitably low permeability is placed between the disc and the surface which it will engage. Further, such covering may also prevent the disc from coming into close contact with the second member so that a small air space is left between them. This arrangement is particularly desirable if the clutch housing were filled with a magnetic fluid, such as iron powder or an iron powder suspension. The arrangement with a non-magnetic covering is also suitable for use with iron powder or an iron powder suspension.

The principal object of the invention is the provision of a new and improved magnetic friction brake or clutch which is simple in construction, positive in operation, is readily controlled remotely by means of electric current, and yet does not require electric current to be continuously supplied at any time.

Another object of the invention is the provision of a new and improved magnetic friction brake or clutch which includes a permanent magnetically pre-polarized clutch or brake disc adapted to be held in frictional engagement with a member of the brake or clutch by the magnetic force, and also including an electro-magnet having the changeable polarity for moving the disc into and out of such frictional engagement.

Still another object of the invention is the provision of a new and improved magnetic friction brake or clutch employing a permanent magnet for controlling the braking or clutching action which does not require slip rings for conveying electrical power to the electro-magnet and does not require a continuous supply of power to the electro-magnet at any time.

Still another object of the invention is the provision of a new and improved magnetic friction brake or clutch, the operation of which may be controlled by brief direct current impulses to an electro-magnet.

Still another object of the invention is the provision of a new and improved magnetic friction brake or clutch wherein the magnetic attraction or repulsion of an electro-magnet on pre-polarized magnetic poles is employed for controlling the operation of the clutch or brake.

The invention may take physical form in certain combinations of parts and arrangements of parts, a preferred embodiment of which will be described in sufficient detail in this specification to enable those skilled in the art to use the invention and will be illustrated in the accompanying drawing, which is a part hereof and wherein;

The single figure is a side cross-sectional view of a magnetic friction brake or clutch constructed in accordance with the present invention.

Referring now to the drawing wherein the showings are for the purposes of illustrating a preferred embodiment of the invention only and not for the purposes of limiting same, the figure shows a combined brake and coupling between a driving 2 and a driven shaft 5. A disc shaped armature 3 is fastened with a key 4 to the drive shaft 2 supported for rotation in a bearing 1.

The driven shaft 5 rotates in a bearing 6 on an axis aligned with the axis of the driving shaft 2 and carries on a reduced diameter portion 7 a clutch disc 8 which is axially movable on but held against relative rotation by a keyway or spline 9.

The clutch disc 8 is made up of a flange 10, of ferromagnetic material, with a permanent radially magnetized ring magnet 11 around its circumference. A ring 12 of ferro-magnetic material is then placed over this ring magnet. The poles formed in the flange 10 and in the outer iron ring 12, as a result of the magnetizing, are designated as N and S.

The whole clutch disc 8 has approximately the same diameter as the armature 3.

An electro-magnet 13 is fastened to the bearing block 6 on the side of the disc opposite from the armature 3. This electro-magnet 13 contains a ring-shaped recess 14 in which an operating winding 15 is placed. This winding 15 is energized from a source of direct current, and, as will be appreciated, depending upon the direction of the direct current the electro-magnet 13 will be polarized differently. Thus with the direct current in one direction, the polarization will be as indicated in the drawing and if the current is flowed in the opposite direction, the polarization will be the direct opposite of that shown in the drawing.

The mechanical assembly of the various parts and the dimensions are so held that the permanently magnetized pole surfaces of the disc 8 and the electro-magnetically actuated poles lie opposite each other at the same radial distance from the axis of rotation. In this respect it will be noted that the electro-magnet has a sufficiently large bore to accommodate the driven shaft 5, as well as the flange of the clutch disc 8.

The portion 7 of reduced diameter of the driven shaft 5 has an extension in the shape of a lug 16 which extends into a bushing 17 fastened to the armature 3. The surface 18 of this armature 3 which faces the disc 8 is covered with a disc or layer 19 of non-magnetic material whose thickness is adapted to the magnetic relationships, that is, the disc 19 is thick enough so that only a part of the magnetic current of the clutch disc penetrates into the metal of the armature 3 which is of a ferro-magnetic material.

For the purpose of describing the operation of the clutch and brake above described, it will be assumed that the disc 8 is polarized, as shown, and lies closely against the non-magnetic disc 19 on the armature 3. The greater part of the flux from the permanent magnet 11 now threads through the metal of the armature 3. In this position the shafts 2 and 5 are coupled together.

If the coil 15 is now so fed by a direct current that a south pole arises in the electro-magnet opposite the north pole of the clutch disc 8, and a north pole arises opposite the south pole of the clutch disc 8, then the clutch disc 8 will be pulled away from the armature 3 and brought into engagement against the surface of the electro-magnet 13. The clutch is now disengaged. Additionally, since the electro-magnet 13 is rigidly connected with the bearing support 6, the shaft 5 is instantly braked. It will be appreciated that the current to the coil 15 may now be turned off and the flux from the permanent magnet 11 will thread into the metal of the electro-magnet 13 and maintain the disc in pressure and frictional engagement therewith.

If a direct current impulses is now flowed in the opposite direction, the poles of the electro-magnet will be correspondingly reversed from that shown in the drawing and the clutch disc 8 will be repelled from the electro-magnet 13 and it will again contact the armature surfaces 18, 19. This process occurs almost instantly so that the direct current impulse need be of very short duration.

The frictional forces involved, either as a clutch or as a brake, can be varied by a corresponding selection of the spacings and the power of the electro-magnetic field.

The apparatus shown in the drawing, and according to the invention, can also be used as a simple clutch instead of a combined brake and coupling. In this case a thrust bearing, not shown, is introduced between the disc 8 and the shoulder on the shaft 5 formed by the portion 7 of reduced diameter, which thrust bearing is so adjusted that an air space remains between the discs 8 and 13 while still permitting the disc 8 to be attracted in the direction of the electro-magnet. The disc 8 does not positively contact or engage with the surfaces of electro-magnet 13 when attracted to the electro-magnet 13 and no braking of the disc 8 results. Such a change in the arrangement, in accordance with the invention, is not especially shown in the drawing for the reason that its operation should be clear to those skilled in the art.

It will be appreciated that it is also possible to allow the electro-magnet 13 to revolve and conduct the current to the magnet through slip rings, it still only being necessary to conduct small impulses of current in order to actuate or shift the clutch or brake.

The current impulse required for operation can come from any power source such as a battery or the electric power lines. If no source of current is available, the current can be created by a hand operated generator because of its low power and short duration.

Having thus described my invention, I claim:

1. A magnetically operated friction device comprising in combination a rotatable driving member of magnetically permeable material and having a flat clutch surface, a driven member rotatable on a common axis with said driving member, a clutch disc having a permanent magnet with at least a pair of ring-shaped magnetic poles facing said driving member and movable on said driven member toward and away from said driving member, and an electro-magnet including spaced magnetically permeable portions having opposite and changeable magnetic polarity disposed on the side of said disc remote from said driving member, said electro-magnet moving sad disc from a first position in which said magnets are attracted towards said driving member and driving engagement therewith, to a second position in which said magnets are attracted towards said electro-magnet even though de-energized.

2. A magnetically operated friction device including in combination: first and second rotatable members, said first member including a magnetically permeable portion and having a friction surface, a third member including a magnetically permeable portion in spaced opposed relationship to said first member magnetically permeable portion, said second member being disposed between said first and third member magnetically permeable portions and having a width less than the space between said portions and movable therebetween, said second member including permanent magnet means having both a north and south magnetic pole facing both of said magnetically permeable portions for magnetically attracting said second member toward either said first or third member magnetically permeable portion depending upon its position relative thereto, said second member having a friction surface engageable with said first member friction surface when said magnet means magnetically attracts said second member towards said first member magnetically permeable portion and means for physically moving said permanent magnet means sufficiently far away from one magnetically permeable portion that it is magnetically attracted to the other.

3. The combination of claim 2 wherein said third member magnetically permeable portion is comprised of at least two spaced elements facing said permanent magnet means and said means for physically moving said permanent magnet means comprise an electro magnet operatively associated with said elements to magnetize adjacent elements with opposite magnetic polarity, said electro magnet having selectable magnetic polarity to either attract or repel said permanent magnet means when electrically energized.

4. The combination of claim 2 wherein said third member is fixed against rotation and has a friction surface, and said second member has a second friction surface engageable with said third member friction surface when said permanent means are magnetically attracted towards said third member magnetically permeable portion.

5. The combination of claim 2 wherein said third member magnetically permeable portion is comprised of at least two spaced elements facing said permanent magnet means said means for physically moving said permanent magnet means comprise an electrically energized, magnetic coil having a selectable magnetic polarity and operatively associated with said elements to magnetize adjacent elements with opposite magnetic polarity, said third member having a friction surface and said second member having a second friction surface engageable with said third member friction surface wherein said magnet means are attracted towards said third member magnetically permeable portion.

6. The combination of claim 2 wherein said first member magnetically permeable portion has a surface of non-magnetic material to limit the attraction of the magnet means thereto.

7. A magnetically operated friction device including in combination: first and second rotatable discs, said first disc being of magnetically permeable material and having an axially facing friction surface, a third disc of magnetically permeable material in spaced opposed relationship to said first disc, said second disc being disposed between said first and third discs and having a width less than the space between said discs and movable therebetween, said second member including a permanent magnet means having both a north and south magnetic pole facing at least said first disc for magnetically attracting said second disc toward either said first or third discs depending upon its position relative thereto, said second disc having a friction surface engageable with said first disc friction surface when said magnet means magnetically attracts said second disc towards said first disc and means for physically forcing said second disc away from either said first or third discs toward the other.

8. The combination of claim 7 wherein said third disc has at least a pair of spaced elements facing said second disc and said means comprise a coil associated with said elements to magnetize same with adjacent elements having opposite magnetic polarity, said coil having selectable magnetic polarity which, depending upon the magnetic polarity, either attracts or repels said second disc and causes said second disc to physically move from said first disc to said second disc respectively.

9. The combination of claim 7 wherein said third disc is fixed against rotation and has a friction surface, and said second disc has a second friction surface engageable with said third member friction surface when a permanent magnet attracts said second disc towards said third disc.

10. The combination of claim 2 wherein said permanent magnet means includes a ring-shaped magnet having a radial axis of magnetization and concentric radially spaced opposite magnetic poles.

11. The combination of claim 7 wherein said permanent magnet is in the form of a ring having a radial axis of magnetization and a pair of concentric radially spaced magnetically permeable rings engage respectively the inner and outer periphery of said magnet ring.

References Cited in the file of this patent

UNITED STATES PATENTS

| | | |
|---|---|---|
| 439,213 | Veeder | Oct. 28, 1890 |
| 517,831 | Arnold | Apr. 10, 1894 |
| 2,560,868 | Hubert | July 17, 1951 |
| 2,612,248 | Feiertag | Sept. 30, 1952 |
| 2,646,145 | Durston | July 21, 1953 |
| 2,727,605 | Rabinow | Dec. 20, 1955 |
| 2,738,449 | Mason | Mar. 13, 1956 |